United States Patent
Wang et al.

(10) Patent No.: US 11,827,805 B1
(45) Date of Patent: Nov. 28, 2023

(54) BASELESS MODIFIED ASPHALT WATERPROOFING COILED MATERIAL BASED ON BASALT FIBER

(71) Applicant: Yunnan Xincheng Waterproof Technology Co., Ltd., Kunming (CN)

(72) Inventors: Jiaxiang Wang, Kunming (CN); Guanlin Liu, Kunming (CN)

(73) Assignee: Yunnan Xincheng Waterproof Technology Co., Ltd., Kunming (CN)

( * ) Notice: Subject to any disclaimer, the term of this patent is extended or adjusted under 35 U.S.C. 154(b) by 0 days.

(21) Appl. No.: 18/359,331

(22) Filed: Jul. 26, 2023

(30) Foreign Application Priority Data

Jul. 27, 2022 (CN) .......................... 202210896086.5

(51) Int. Cl.

| | | |
|---|---|---|
| *C09D 195/00* | (2006.01) | |
| *C08L 95/00* | (2006.01) | |
| *C08K 7/10* | (2006.01) | |
| *C09D 7/40* | (2018.01) | |
| *C09D 7/61* | (2018.01) | |
| *C08K 3/26* | (2006.01) | |
| *C09D 7/65* | (2018.01) | |
| *C09D 7/80* | (2018.01) | |

(52) U.S. Cl.
CPC .............. *C09D 195/00* (2013.01); *C08K 3/26* (2013.01); *C08K 7/10* (2013.01); *C08L 95/00* (2013.01); *C09D 7/61* (2018.01); *C09D 7/65* (2018.01); *C09D 7/69* (2018.01); *C09D 7/80* (2018.01); *C08K 2003/265* (2013.01); *C08K 2201/005* (2013.01)

(58) Field of Classification Search
None
See application file for complete search history.

(56) References Cited

U.S. PATENT DOCUMENTS

2021/0087443 A1   3/2021   Kelley et al.

FOREIGN PATENT DOCUMENTS

| CN | 105462541 A | 4/2016 | |
|---|---|---|---|
| CN | 109867491 A | 6/2019 | |
| CN | 111873582 A | 11/2020 | |
| CN | 112430012 A | 3/2021 | |
| CN | 112300757 B | * 7/2021 | .............. C09J 11/04 |
| CN | 113604064 A | 11/2021 | |
| JP | 2001132179 A | 5/2001 | |

OTHER PUBLICATIONS

Cai, CN 112300757 B, English Translation from FIT (Year: 2021).*
Search Report for China Application No. 202210896086.5.
Notice of Registration for China Application No. 202210896086.5, dated May 29, 2023.
Xu Maozhen et al., "Development of self-adhered modified asphalt waterproofing membrane for high heat resistance," New Building Materials, Apr. 2013, pp. 39-42.
Song Yunxiang et al., "Road Performance of Basalt Fiber Reinforced Asphalt Mastic," Journal of Highway and Transportation Research and Development, Aug. 2012, vol. 29, No. 8.
Su Xing et al., "Research on the Production Process of Non-reinforcement Selfadhesive Polymer Modified Asphalt Waterproofing Membrane," Building Waterproofing in China, Jun. 2012, pp. 40-43.
Li Hua, "Study of new industry standard for building materials JCT/690-2008 "Reclaim Crumb Rubber Modified Bituminous Waterproofing Sheet Using a Combinative Reinforcement of Nonwove and Glass Fabric Mesh" and discussion of some issues," Guangdong Building Materials, Feb. 2009, Issue 2.

* cited by examiner

*Primary Examiner* — Colin W. Slifka
(74) *Attorney, Agent, or Firm* — Piloff Passino & Cosenza LLP; Sean A. Passino; Rachel K. Pilloff

(57) ABSTRACT

A baseless modified asphalt waterproofing coiled material based on basalt fiber is provided by the present application, including a composition coated on a surface of a coiled material; according to 100 parts by weight, the composition includes: 40-45 parts of asphalt, 15-20 parts of softening oil, 4.5-5.5 parts of high-temperature tackifier, 3.5-4 parts of basalt fiber chopped filament and 27-33 parts of filler.

6 Claims, No Drawings

BASELESS MODIFIED ASPHALT WATERPROOFING COILED MATERIAL BASED ON BASALT FIBER

CROSS-REFERENCE TO RELATED APPLICATIONS

This application claims priority to Chinese Patent Application No. 202210896086.5, filed on Jul. 27, 2022, the contents of which are hereby incorporated by reference.

TECHNICAL FIELD

The present application relates to the technical field of waterproof coatings, and in particular to a baseless modified asphalt waterproofing coiled material based on basalt fiber.

BACKGROUND

The baseless waterproofing coiled material mainly uses tackifying resin to improve the bonding strength of the coiled material, so as to enable a firm bonding between the coiled material and base level. Strong bonding is achieved at the initial bonding stage, and the firm bonding is developed above 5 degrees Celsius (° C.) without the aid of heating equipment, which is safe, environment-friendly and convenient. It has an excellent self-healing property in respect of fine cracks produced by external stress, in addition to durable adhesion, no shedding, no water run-off when bonded to the base layer, and same service life as the coiled material in the area of the overlap joints itself; the material has large elongation (higher or equal to 30%), and has strong adaptability to base layer contraction, deformation and cracking. The baseless waterproofing coiled material does not flow at high temperatures, nor cracking at low temperatures (high temperature of 70° C., low temperature of –20° C.), covering a wide range of operating temperatures.

At present, the preparation process of self-adhesive baseless waterproofing coiled material includes high temperatures (generally around 180° C.), complicated process of adding modifier, prolonged procedures, and long-term dosing process, while providing poor strength as compared with that of the based products. Compared with based products, the strength of baseless products is much worse, and the high heating temperature before construction causes problems such as high energy consumption and poor strength of baseless products.

In the prior art, CN113604064A discloses an application of a stabilizer for improving tearing performance of baseless waterproofing coiled materials, including preparing a modified asphalt self-adhesive by adding raw materials in percentage by mass as follows: 35-60% of asphalt, 5-20% of naphthenic rubber oil, 2-15% of styrene-butadiene-styrene (SBS), 2-15% of reclaimed butyl rubber and 1-7% of terpene resin, 2-15% of cement, 15-35% of filler and 0.2-1.5% of additive, with a reinforcement membrane of a composite membrane of polyethylene and polypropylene, and an isolation membrane of a polyethylene terephthalate (PET) aluminized silicone oil membrane. However, Table 2 of the CN113604064A shows that by adding this stabilizer to baseless waterproofing coiled material, the highest value of untreated coiled material and coiled material peel strength is 2.3 N/mm, yet the CN113604064A fails to provide an uncoiling condition at 45° C.

In order to meet the requirements of baseless waterproofing coiled material for coil peel strength, existing technologies often include bonding more binder on the coiled material surface, which leads to the failure of normal uncoiling of the available coiled material at 45° C., since the existing binder is positioned only on the viscosity and strength, and does not take into account the paving performance of the coiled material after uncoiling. Nevertheless, paving performance is related to the construction difficulty of the coiled material; there are curls and folds after the coiled material is spread, making it difficult to pave the coiled material flat during construction, resulting in reduced waterproofing performance caused by gaps on the surface of the construction generated after the construction, increasing the construction difficulty. However, by decreasing the thickness of the binder set on the coiled material, the bonding strength of the waterproofing coiled material and the construction of the surface of the base layer are negatively affected, and obvious gaps are generated between the coiled material and the base layer surface of the construction with the increased service life, thereby negatively affecting the waterproofing effect.

SUMMARY

The present application provides a baseless modified asphalt waterproofing coiled material based on basalt fiber, so as to solve the technical problems of the existing baseless modified asphalt waterproofing coiled material, that is, the existing baseless modified asphalt waterproofing coiled material only takes into account the peeling strength of the coiled material, and fails to meet the requirements of better construction after paving at 45 degrees Celsius (° C.), which results in the existence of gaps between the coiled material and the construction surface after construction, or the reduction of bonding strength or wrinkling of the coiled material after paving, in addition to reduced waterproofing performance of the coiled material as a result of the difficulty of eliminating pre-stress.

The present application provides a baseless modified asphalt waterproofing coiled material based on basalt fiber, including a composition coated on a surface of a coiled material; according to 100 parts by weight, the composition includes: 40-45 parts of asphalt, 15-20 parts of softening oil, 4.5-5.5 parts of high-temperature tackifier, 3.5-4 parts of basalt fiber chopped filament and 27-33 parts of filler;

optionally, the high-temperature tackifier is prepared by compounding styrene-butadiene-styrene (SBS) and styrene-butadiene rubber (SBR) according to a mass ratio of 1:0.2-0.5;

the basalt fiber chopped filament is continuous basalt fiber precursor chopped into 1-2 micrometers (μm), with chopped precursor coated with a silane impregnating agent on a surface;

a preparation method includes following steps:
1) weighing the asphalt and the softening oil, heating and melting, followed by mixing and stirring, and heating to a temperature of 180-190 degrees Celsius (° C.) while stirring;
2) keep the temperature between 180° C. and 190° C., slowly adding the high-temperature tackifier, stirring to avoid overflow caused by melting expansion, and continue stirring until all materials are completely melted, then carrying out a next step;
3) adding the chopped precursor of basalt fiber chopped filament, then maintaining a temperature of between 170° C. and 180° C., with stirring continued; and
4) adding the filler, then stirring at 160-165° C., and discharging materials to obtain the composition; the composition forms a membrane adhering to the surface of the coiled material, with a membrane thickness of 1.2-2.0 millimeters (mm).

The obtained coiled material is easy to uncoil when being uncoiled at 45° C., and the coiled material is flat without obvious bending after uncoiling.

The high-temperature tackifier obtained in this application by mixing SBS and SBR in the above ratio is capable of comprehensively improving the resistance properties of the non-curing asphalt waterproofing coating to heat, aging, and water, in addition to improved airtightness. Specifically, the composition obtained is improved in terms of membrane-forming uniformity on the surface of the coiled material, and a coiled material with flatness under flat laying at 45° C. is obtained.

In this coiled material, the chopped precursor of basalt fiber with surface impregnated by silane-impregnating agent is added therein to enhance the flatness of the coiled material when being paved flat at 45° C.; by using the higher strength characteristics of these fibers, bending or folding is avoided, and the construction qualifying rate is improved, with the number of cracks or wrinkles between the coiled material and the substrate after construction being reduced, and the difficulty of construction is lessened.

The high-temperature tackifier provided in this application simplifies the preparation process and optimizes the processing conditions. The production of existing baseless products is complicated due to the addition of different modifiers that requires different temperatures to be adjusted according to the characteristics of the added material; with this high-temperature tackifier, there is no need to add modifiers in batches, and just the above high-temperature tackifier is added under the same conditions, which effectively simplifies the production process; this method of preparation enables better control of the temperature, which not only simplifies the process, but also reduces the energy consumption.

As for the formula of adding basalt fiber, the basalt fiber is the main material for reinforcing thermoplastic resin. Basalt is a type of high-performance volcanic rock component, after wrapping with silane impregnating agent, the cohesion of chopped precursor of basalt fiber with asphalt, cement is improved to achieve better compatibility. This special silicate enables basalt fiber to have excellent chemical resistance, especially with the advantage of alkali resistance. It can improve the high temperature stability, low temperature crack resistance and fatigue resistance of asphalt and concrete. High-temperature tackifiers combine the functions of traditionally used SBS, SBR, C5 resins, etc., with special processes and ratio adjustments to greatly enhance the modification effect. The basalt fibers used have excellent chemical stability, with resistance to acid, alkali and salt, excellent performance at high and low temperatures, and good resistance to ultraviolet radiation.

The above processing conditions are used to prepare this baseless coiled material, which can effectively improve the compatibility of the components, enhance the strength of the baseless product, and so on.

Optionally, in the step 1), a stirring speed is 200-300 revolutions per minute (r/min).

Optionally, in the step 2), a stirring speed is 400-600 r/min.

Optionally, in the step 3), the stirring is carried out at a stirring speed of 400-600 r/min for a duration of 45-60 min.

Optionally, in the step 4), a medium speed stirring of 200-300 r/min is carried out for 30 to 45 min.

Optionally, the filler is heavy calcium carbonate with a mesh number of 120-150.

The present application achieves the following beneficial effects:

the baseless modified asphalt waterproofing coiled material based on basalt fiber provided by this application solves the problems existing in the prior art that the high temperature of the preparation process, the cumbersome dosing process, the long duration and other technological problems by adding high-temperature tackifier, and by adding the basalt fiber chopped filament, greatly enhancing the strength of the baseless product itself; both the advantages of baseless and based products are achieved at the same time, and the resulting coiled material is easy to uncoil at 45° C., and after uncoiling, the coil spreads and does not have any obvious bends.

DETAILED DESCRIPTION OF THE EMBODIMENTS

In order to make the objectives, technical schemes and advantages of the embodiments of the present application clearer, the technical schemes in the embodiment of the present application are described clearly and completely in combination with the specific embodiments of the present application. Obviously, the described embodiments are a part of the embodiments of the present application, but not the whole embodiments. The components of the embodiments of the present application generally described herein may be arranged and designed in a variety of different configurations.

Therefore, the following detailed description of the embodiments of the present application is not intended to limit the scope of the claimed application, but merely represents selected embodiments of the application. Based on the embodiments in the present application, all other embodiments obtained by ordinary technicians in the field without creative work belong to the scope of protection of the present application.

The technical means not detailed in this application and not used to solve the technical problems in this application are all set according to the common knowledge in the field, and may be realized by various common knowledge setting methods.

EMBODIMENTS

Unless otherwise specified, the materials and instruments used in the following embodiments are all commercially available.

Embodiments 1-3

The materials added in Embodiments 1 to 3 are added as shown in Table 1 and Table 2 below.

TABLE 1

(in parts by weight)

| S/N of projects | Asphalt | Softening oil | High-temperature tackifier | Basalt fiber | 120-mesh heavy calcium powder |
|---|---|---|---|---|---|
| Embodiment 1 | 45 | 15 | 5 | 3.5 | 31.5 |
| Embodiment 2 | 40 | 20 | 4.5 | 4 | 31.5 |
| Embodiment 3 | 40 | 20 | 5.5 | 4 | 30.5 |

TABLE 2

| | (in parts by weight) | |
|---|---|---|
| S/N of projects | SBS | SBR |
| Embodiment 1 | 1 | 0.2 |
| Embodiment 2 | 1 | 0.4 |
| Embodiment 3 | 1 | 0.5 |

The preparation method in Embodiments 1 to 3 are carried out according to the following steps:

1) the required asphalt and softening oil are weighed according to the production formula, heated and melted, then the stirring is started, and the stirring is continued while heating;
2) the high-temperature tackifier is added slowly, with stirring and avoiding spillage caused by melting, the temperature is maintained and stirring is continued until the melting is complete and the next step is carried out;
3) the basalt fiber is added, then the temperature is maintained and the stirring is continued; and
4) the filler is added according to the requirements of the formula, followed by heat preservation and mixing, and then the material is discharged.

The processing parameters in the preparation method in Embodiments 1 to 3 are illustrated in the following table:

| S/N of embodiments | step 1) | step 2) | step 3) | step 4) |
|---|---|---|---|---|
| 1 | 185° C., stirring speed of 250 r/min. | 185° C.; stirring speed of 500 r/min. | 175° C.; stirring speed of 500 r/min, 50 min. | stirring at 162° C. for 35 min. |
| 2 | 180° C., stirring speed of 200 r/min. | 190° C.; stirring speed of 600 r/min. | 180° C.; stirring speed of 600 r/min, 45 min. | stirring at 165° C. for 30 min. |
| 3 | 190° C., stirring speed of 300 r/min. | 180° C.; stirring speed of 400 r/min. | 170° C.; stirring speed of 400 r/min, 60 min. | stirring at 160° C. for 45 min. |

Comparative Embodiment 1

The difference from Embodiment 1 is that the high-temperature tackifier and the basalt fiber chopped filament are not used.

Comparative Embodiment 2

The difference of the present comparative embodiment from the Embodiment 1 is that a stabilizer is formulated according to the stabilizer disclosed in CN113604064A and then added to the composition obtained, and a baseless waterproofing coiled material is prepared.

The sample of coiled material obtained in Embodiment 1 is examined, and the results obtained are shown in Table 3 below. The results obtained from Embodiments 2 to 3 are similar to Embodiment 1 and will not be repeated here. Methods of detection are in accordance with the public method of GB 23441-2009 "Self-adhering polymer modified bituminous waterproof sheet".

TABLE 3

| | Performance test data | | | | | |
|---|---|---|---|---|---|---|
| S/N of Test items | Test items | | Tested values of Embodiment 1 | Technical index of national standard | Comparative embodiment 1 | Comparative embodiment 2 |
| 1 | Tension/(N/50 mm) | | 385 | ≥150 | 135 | 173 |
| 2 | Elongation at maximum tension/% | | 479 | ≥200 | 356 | 387 |
| 3 | Asphalt elongation at break/% | | 536 | ≥250 | 402 | 436 |
| 4 | Tear strength of nail shaft/N | | 156 | ≥60 | sixty-eight | 70 |
| 5 | Heat resistance, sliding at 70° C. shall not exceed 2 mm | | No sliding at 85° C. | Sliding at 70° C. shall not exceed 2 mm | Slide by 0.8 mm at 70° C. | No sliding at 70° C. |
| 6 | low temperature flexibility | | No crack at −20° C. | No crack at −20° C. | No crack at −20° C. | No crack at −20° C. |
| 7 | Peel strength (N/mm) | Coiled material and coiled material | 5.4 | ≥1.0 | 1.3 | 1.6 |
| 8 | | Coiled material and aluminum plate | 5.3 | ≥1.5 | 1.8 | 2.0 |
| 9 | Oil permeability/sheet number | | 1 | ≤2 sheets | 1 | 1 |
| 10 | Stickiness/min | | >60 min | ≥20 | 45 min | >60 min |
| 11 | Thermostability | Exterior | No bulging, wrinkling, sliding and flowing. | No bulging, wrinkling, sliding and flowing. | Slight slip | No bulging, wrinkling, sliding and flowing. |
| | | Size change/% ≤ | 0.4 | 2 | 2.3 | 1.8 |

It can be seen from Table 3 that the performance of the baseless modified asphalt waterproofing coiled material based on high-performance basalt fiber prepared by the method provided by this application can meet the standard of performance testing, and obviously exceeds the requirements of the national standard in terms of tensile properties (tensile force and elongation), nail rod tearing strength, heat resistance, heat stability and other aspects, and has greater performance enhancement in comparison with existing baseless products, narrowing the difference between baseless and based products in terms of strength, enabling the baseless products to be improved and enhanced in the aspects of resistance to deformation, tearing, etc.

Moreover, by using this method to produce baseless products, the dosing process is comparatively simpler and the process is more optimized, making it possible to shorten the dosing duration and reduce energy consumption.

Construction Test

The samples obtained in Embodiment 1 and Comparative embodiments 1-2 are applied in construction according to the requirements of national standards, and the results are shown in the following table.

TABLE 4

| S/N | Uncoiling at 45° C. | Bonding condition of base layer | Bonding effect (N/mm) |
| --- | --- | --- | --- |
| Embodiment 1 | Easy to uncoil, and after uncoiling, the coil is flat without obvious bending. | Full viscosity | 2.7 |
| Comparative embodiment 1 | Uncoiling is a little difficult, and the coil is not upright. After uncoiling, the core of coiled material is obviously wrinkled. | Good adhesion | 1.3 |
| Comparative embodiment 2 | Uncoiling is a little difficult, and the coil is not upright. After uncoiling, the core of coiled material is obviously wrinkled. | Full viscosity | 1.8 |

It can be seen from Table 4 that the baseless modified asphalt waterproofing coiled material based on high-performance basalt fiber prepared by the formula provided in this application improves the verticality and appearance quality of baseless asphalt coiled material. The basalt fiber is fused with the asphalt after being added, and the strength of the composition is enhanced, which alleviates and reduces the common problem of large wrinkle area at the core position after unrolling of baseless asphalt coiled materials.

Upon adopting the asphalt coiled material provided by this application and the existing method of construction, the wrinkles at the core of the coiled material are easily paved, and after construction, the region exists no obvious traces of bending; after paving construction, there is no gap between the coiled material and the substrate, and the waterproofing effect is greatly improved.

Furthermore, the basalt fiber offers excellent chemical resistance, especially with the advantage of alkali resistance, and therefore is capable of improving the high-temperature stability, low-temperature crack resistance and fatigue resistance of asphalt and concrete.

Although the present application has been described in detail with reference to the foregoing embodiments, for those skilled in the art, it is still possible to make modifications to the technical schemes recorded in the foregoing embodiments or to make equivalent replacements for some of the technical features therein, and any modifications, equivalent replacements, improvements, etc. made within the spirit and principles of the present application shall be included in the scope of protection of the present application.

What is claimed is:

1. A baseless modified asphalt waterproofing coiled material based on basalt fiber, comprising a composition coated on a surface of a coiled material; the composition comprises, according to 100 parts by weight, 40-45 parts of asphalt, 15-20 parts of softening oil, 4.5-5.5 parts of high-temperature tackifier, 3.5-4 parts of basalt fiber chopped filament and 27-33 parts of filler;
   the high-temperature tackifier is prepared by compounding SBS and SBR according to a mass ratio of 1:0.2-0.5;
   the basalt fiber chopped filament is continuous basalt fiber precursor chopped to 1-2 μm, with chopped precursor coated with a silane impregnating agent on a surface; and
   a preparation method of the baseless modified asphalt waterproofing coiled material comprises following steps:
   1) Weighing the asphalt and the softening oil, heating and melting, followed by mixing and stirring, and heating to a temperature of 180° C.-190° C. while stirring;
   2) Keeping the temperature between 180° C. and 190° C., slowly adding the high-temperature tackifier, stirring to avoid overflow caused by melting expansion, and continuing stirring until materials are completely melted, then carrying out a next step;
   3) Adding the chopped precursor of basalt fiber chopped filament, then maintaining a temperature of 170° C.-180° C., and continuing stirring; and
   4) Adding the filler, then stirring at 160° C.-165° C., and discharging materials to obtain the composition; the composition forms a membrane adhering to the surface of the coiled material, with a membrane thickness of 1.2-2.0 mm;
   the coiled material obtained is easy to uncoil when being uncoiled at 45° C., and the coiled material is flat without obvious bending after uncoiling.

2. The baseless modified asphalt waterproofing coiled material based on basalt fiber according to claim 1, wherein in the step 1), a stirring speed is 200-300 r/min.

3. The baseless modified asphalt waterproofing coiled material based on basalt fiber according to claim 1, wherein in the step 2), a stirring speed is 400-600 r/min.

4. The baseless modified asphalt waterproofing coiled material based on basalt fiber according to claim 1, wherein in the step 3), the stirring is carried out at a stirring speed of 400-600 r/min for 45-60 minutes.

5. The baseless modified asphalt waterproofing coiled material based on basalt fiber according to claim 1, wherein in the step 4), the stirring is carried out at 200-300 r/min for 30-45 minutes.

6. The baseless modified asphalt waterproofing coiled material based on basalt fiber according to claim 1, wherein the filler is heavy calcium carbonate with a mesh number of 120-150.

* * * * *